(12) United States Patent
Rajasooriya et al.

(10) Patent No.: US 10,659,488 B1
(45) Date of Patent: May 19, 2020

(54) STATISTICAL PREDICTIVE MODEL FOR EXPECTED PATH LENGTH

(71) Applicants: Sasith Maduranga Rajasooriya, Franklin, OH (US); Chris Peter Tsokos, Tampa, FL (US); Pubudu Kalpani K. Hitigala Kaluarachchilage, Franklin, OH (US)

(72) Inventors: Sasith Maduranga Rajasooriya, Franklin, OH (US); Chris Peter Tsokos, Tampa, FL (US); Pubudu Kalpani K. Hitigala Kaluarachchilage, Franklin, OH (US)

(73) Assignee: University of South Florida, Tampa, FL (US)

( * ) Notice: Subject to any disclaimer, the term of this patent is extended or adjusted under 35 U.S.C. 154(b) by 151 days.

(21) Appl. No.: 15/907,968

(22) Filed: Feb. 28, 2018

Related U.S. Application Data

(60) Provisional application No. 62/464,609, filed on Feb. 28, 2017.

(51) Int. Cl.
 *H04L 29/06* (2006.01)
(52) U.S. Cl.
 CPC .............................. *H04L 63/1433* (2013.01)
(58) Field of Classification Search
 None
 See application file for complete search history.

(56) References Cited

U.S. PATENT DOCUMENTS

| | | | | |
|---|---|---|---|---|
| 10,268,660 | B1* | 4/2019 | Arazi | A63F 13/50 |
| 2006/0178887 | A1* | 8/2006 | Webber | G10L 15/144 |
| | | | | 704/256 |
| 2008/0010225 | A1* | 1/2008 | Gonsalves | G06N 7/005 |
| | | | | 706/11 |
| 2008/0098479 | A1* | 4/2008 | O'Rourke | G06F 21/577 |
| | | | | 726/25 |
| 2016/0078309 | A1* | 3/2016 | Feldman | G01B 9/0203 |
| | | | | 382/131 |

(Continued)

OTHER PUBLICATIONS

Sunil Abraham and Suku Nair, "A Predictive Framework for CyberSecurity Analytics Using Attack Graphs", Jan. 2015, International Journal of Computer Networks & Communications (IJCNC) vol. 7, No. 1. (Year: 2015).*

(Continued)

*Primary Examiner* — Kaveh Abrishamkar
(74) *Attorney, Agent, or Firm* — Thomas | Horstemeyer, LLP

(57) ABSTRACT

A statistical model for predicting an expected path length ("EPL") of the steps of an attacker is described. The model is based on utilizing vulnerability information along with an attack graph. Using the model, it is possible to identify the interaction among vulnerabilities and individual variables or risk factors that drive the EPL. Gaining a better understanding of the relationship between the vulnerabilities and their interactions can provide security administrators with a better view and understanding of their security status. In addition, a number of different attributable variables and their contribution in estimating the EPL can be ranked. Thus, it is possible to utilize the ranking process to take precautions and actions to minimize the EPL.

18 Claims, 6 Drawing Sheets

(56) References Cited

U.S. PATENT DOCUMENTS

2017/0046519 A1* 2/2017 Cam ................. G06F 21/577

OTHER PUBLICATIONS

Sasith Rajasooriya, Chris Tsokos, Pubudu Kalpani Kaluarachchi, "Stochastic Modelling of Vulnerability Life Cycle and Security Risk Evaluation", Jul. 2016, Journal of Information Security, 2016, 7, 269-279. (Year: 2016).*

Kaluarachchi, P.K., Tsokos, C.P. and Rajasooriya, S.M. (Apr. 2016) Cybersecurity: A Statistical Predictive Model for the Expected Path Length. Journal of information Security, vol. 7, 112-128. http://dx.doi.org/10.4236/jis.2016.73008.

Sasith M. Rajasooriya, Chris P. Tsokos, Pubudu Kalpani Kaluarachchi (Jul. 2016) Stochastic Modelling of Vulnerability Life Cycle and Security Risk Evaluation. Journal of Information Security, vol. 7,269-279. http://dx.doi.org/10.4236/is.2016.74022.

Rajasooriya, S.M., Tsokos, C.P. and Kaluarachchi, P.K. (Apr. 2017) Cyber Security: Nonlinear Stochastic Models for Predicting the Exploitability. Journal of Information Security, vol. 8, 125-140. http://dx.doi.org/10.4236/jis.2017.82009.

Kaluarachchi, P.K., Tsokos, C.P. and Rajasooriya, S.M. (Nov. 2017), Non-Homogeneous Stochastic Model for Cyber Security Predictions. Journal of Information Security,vol. 9, 12-24. https://doi.org/10.4236/jis.2018.91002.

Secunia Vulnerability Review 2015: Key Figures and Facts from a Global Information Security Perspective. Mar. 2015. https://secunia.com/?action=fetch&filename=secunia_vulnerability_review_2015_pdf.pdf.

NVD, National Vulnerability Database, Accessed Jun. 13, 2018, http://nvd.nist.gov/.

Kijsanayothin, P. (May 2010) Network Security Modeling with Intelligent and Complexity Analysis. PhD Dissertation, Texas Tech University, Lubbock.

Alhazmi, O.H., Malaiya, Y.K. and Ray, I. (May 2007) Measuring, Analyzing and Predicting Security Vulnerabilities in Software Systems. Computers and Security Journal, vol. 26, Issue 3, pp. 219-228. doi:10.1016/j.cose.2006.10.002.

Noel, S., Jacobs, M., Kalapa, P. and Jajodia, S. (Nov. 2005) Multiple Coordinated Views for Network Attack Graphs. VIZSEC'05: Proc. of the IEEE Workshops on Visualization for Computer Security, Minneapolis, Oct. 2005, 99-106.

Mehta, V., Bartzis, C., Zhu, H., Clarke, E.M. and Wing, J.M. (Sep. 2006) Ranking Attack Graphs. In: Zamboni, D. and Krugel, C., Eds., Recent Advances in Intrusion Detection, RAID 2006, Lecture Notes in Computer Science, vol. 4219, Springer, Berlin, Heidelberg, 127-144. http://dxdoi.org/10.1007/11856214_7.

Frei, S. (2009) Security Econometrics: The Dynamics of (IN) Security, vol. 93, PhD Dissertation, ETH, Zurich.

Schiffman, M. (2014) Common Vulnerability Scoring System (CVSS). http://www.first.org/cvss/.

Bass, T. (Apr. 2000) Intrusion Detection System and Multi-Sensor Data Fusion. Communications of the ACM, vol. 43, Issue 4, pp. 99-105.

Jajodia, S. and Noel, S. (2005) Advanced Cyber Attack Modeling, Analysis, and Visualization. 14th USENIX Security Symposium, Technical Report, Mar. 2010, George Mason University, Fairfax, VA.

Abraham, S. and Nair, S. (Dec. 2014) Cyber Security Analytics: A Stochastic Model for Security Quantification Using Absorbing Markov Chains. Journal of Communications, vol. 9, No. 12, 899-907. https://doi.org/10.12720/icm.9.12.899-907.

Wang, L, Singhal, A. and Jajodia, S. (Jul. 2007) Measuring Overall Security of Network Configurations Using Attack Graphs. Data and Applications Security XXI, Lecture Notes in Computer Science, vol. 4602. Springer, Berlin, Heidelberg , 98-112. https://doi.org/10.1007/978-3-540-73538-0_9.

Wang, L, Islam, T., Long, T., Singhal, A. and Jajodia, S. (Mar. 2008) An Attack Graph-Based Probabilistic Security Metric. DAS 2008, LNCS 5094, 283-296.

R statistics Tool. http://www.r-project.org, accessed Jun. 12, 2018.

Joh, H. and Malaiya, Y.K. (2010) A Framework for Software Security Risk Evaluation Using the Vulnerability Lifecycle and CVSS Metrics. Proceedings of the International Workshop on Risk and Trust in Extended Enterprises, Nov. 2010, 430-434.

Alhazmi, O.H. and Malaiya, Y.K. (Mar. 2008) Application of Vulnerability Discovery Models to Major Operating Systems. IEEE Transactions on Reliability, vol. 57, Issue 1, pp. 14-22. http://dx.doi.org/10.1109/TR.2008.916872.

Alhazmi, O.H. and Malaiya, Y.K. (Dec. 2005) Modeling the Vulnerability Discovery Process. Proceedings of 16th International Symposium on Software Reliability Engineering, Chicago, Nov. 8-11, 2005, 129-138. http://dx.doi.org/10.1109/ISSRE.2005.30.

CVE Details, Accessed on Jun. 14 2018, http://www.cvedetails.com/.

2016 U.S Government Cybersecurity Report Security Scorecard R&D Department, Apr. 2016. https://cdn2.hubspot.net/hubfs/533449/SecurityScorecard_2016_Govt_Cybersecurity_Report.pdf.

Symantec, Internet Security Threat Report 2016, vol. 21, Apr. 2016. https://www.symantec.com/content/dam/symantec/docs/reports/istr-21/2016-en.pdf.

Dudorov, et al., Probability Analysis of Cyber Attack Paths against Business and Commercial Enterprise Systems, Intelligence and Security Informatics Conference (EISIC), 2013 European, Aug. 2013.

Marconato, et al., Security-related vulnerability life cycle analysis, 2012 7th International Conference on Risks and Security of Internet and Systems (CRiSIS), Oct. 2012.

Marconato, et al., A Vulnerability Life Cycle-Based Security Modeling and Evaluation Approach, The Computer Journal, vol. 56, No. 4, Oxford University Press on behalf of the British Computer Society, Advanced Access on Sep. 3 2012.

Mkpong-Ruffin, et al., Quantitative Software Security Risk Assessment Model, QoP '07 Proceedings of the 2007 ACM workshop on Quality of protection, Oct. 2007.

"H. Joh and Y. K. Malaiya, Defining and Assessing Quantitative Security RiskMeasures Using Vulnerability Lifecycle and CVSS Metrics, The 2011 International Conference on Security and Management (sam), Jul. 2011."

Singhal, A. and Ou, X., Security Risk Analysis of Enterprise Networks Using Probabilistic Attack Graphs, NIST Interagency Report 7788, Aug. 2011, Computer Security Division Information Technology Laboratory National Institute of Standards and Technology, Gaithersburg, MD.

Xie, Lixia, Xiao Zhang, and Jiyong Zhang. "Network Security Risk Assessment Based on Attack Graph." Journal of Computers, vol. 8, No. 9 (Sep. 2013): 2339-2347.

Homer, John, Xinming Ou, and David Schmidt. "A sound and practical approach to quantifying security risk in enterprise networks." Kansas State University Technical Report, Computing and Information Sciences Department. Aug. 2009, pp. 1-15.

Secunia Research, "Key figures and facts on vulnerabilities from a global information security perspective", Vulnerability Review 2016, Mar. 2016, Flexera Software LLC.

* cited by examiner

STATISTICAL PREDICTIVE MODEL FOR EXPECTED PATH LENGTH

CROSS-REFERENCE TO RELATED APPLICATIONS

This application claims the benefit of U.S. Provisional Application No. 62/464,609, filed Feb. 28, 2017, the entire contents of which is hereby incorporated herein by reference. This application is also related to U.S. Non-Provisional application Ser. No. 15/875,249, filed Jan. 19, 2018, the entire contents of which is hereby incorporated herein by reference. This application is also related to U.S. Non-Provisional application Ser. No. 15/907,810, titled "VULNERABILITY LIFE CYCLE EXPLOITATION TIMING MODELING," filed on even date herewith, the entire contents of which is hereby incorporated herein by reference.

BACKGROUND

In computing systems, a vulnerability can be defined as a weakness in software, hardware, firmware, etc. that can be exploited to gain access to certain resources. The management of vulnerabilities includes the practice of identifying and classifying vulnerabilities in computing systems and removing them. A vulnerability for which a working and implemented attack is known can be described as an exploitable vulnerability. A vulnerability is exploitable from the time when it is introduced to when it is removed or patched.

Vulnerabilities can be relatively difficult to categorize and mitigate. The Common Vulnerability Scoring System (CVSS) provides a way to characterize or define the principal characteristics of a vulnerability. The CVSS also provides a numerical score that reflects the severity of various vulnerabilities. The numerical score can be presented as a qualitative representation (e.g., low, medium, and high risk) to help prioritize vulnerability management processes.

BRIEF DESCRIPTION OF THE DRAWINGS

For a more complete understanding of the embodiments and the advantages thereof, reference is now made to the following description, in conjunction with the accompanying figures briefly described as follows.

Figure 1:
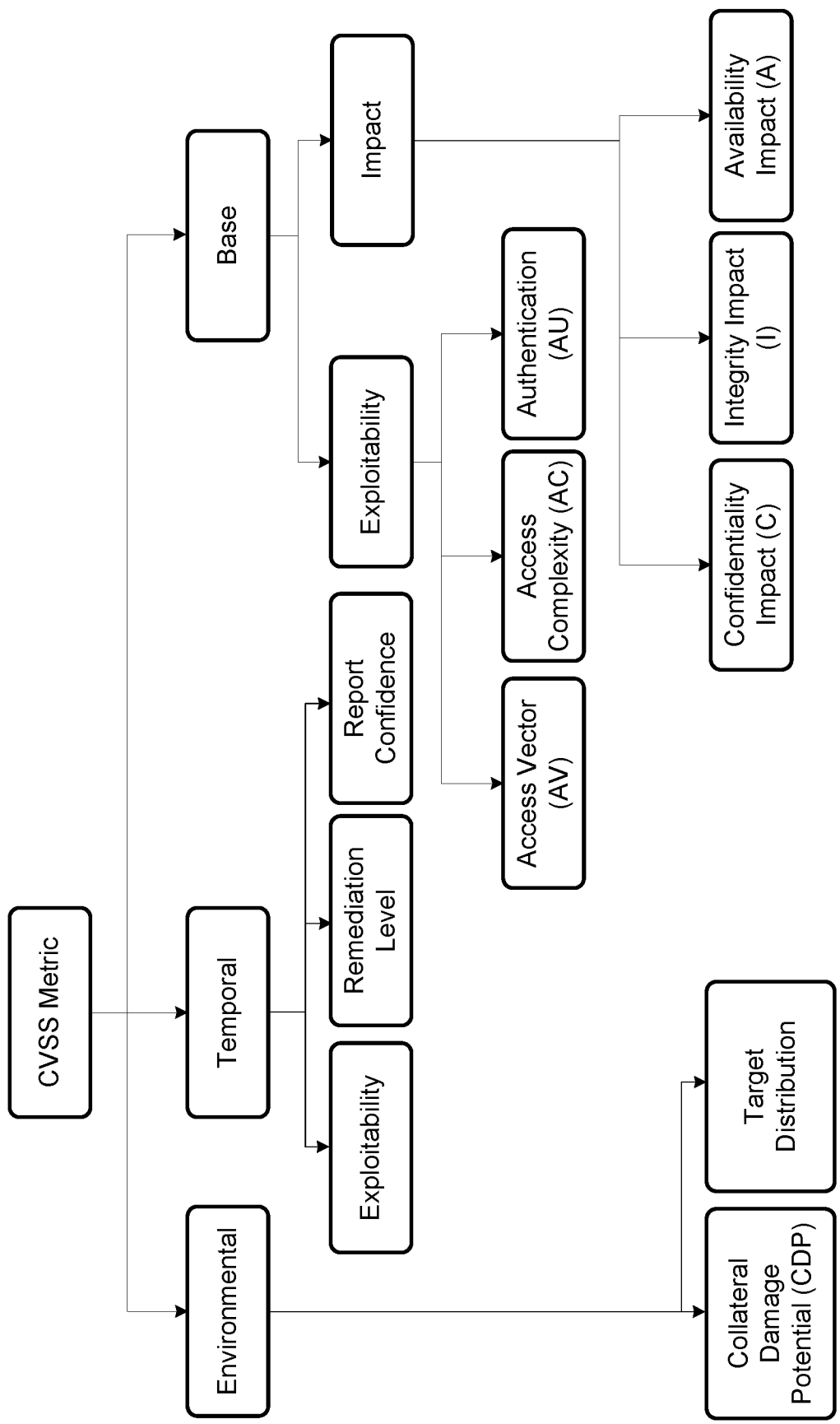
FIG. 1 illustrates organizational aspects of the Common Vulnerability Scoring System (CVSS) framework according to various examples described herein.

The drawings illustrate only example embodiments and are therefore not to be considered limiting of the scope of the embodiments described herein, as other embodiments are within the scope of the disclosure.

DETAILED DESCRIPTION

Cyber-attacks are a formidable security challenge faced by most governments and large scale companies, among other entities. Cyber criminals are using increasingly sophisticated network and social engineering techniques to steal crucial information which directly affects government and company objectives. Thus, in understanding the performance, availability, and reliability of computer networks, quantitative measurement techniques play an important role. Quantitative measures are now commonly used to evaluate the security of computer network systems. These measures help administrators make important decisions regarding network security.

Cyber situational awareness is related to the knowledge of friendly, adversary, and other relevant information regarding activities in and through cyberspace. It can be obtained from a combination of intelligence and operational activity in cyberspace and other domains (including the electromagnetic spectrum), both unilaterally and through collaboration among partners.

Cyber situational awareness helps security analysts and decision makers visualize and understand the current state of the information technology (IT) infrastructure, as well as the defensive posture of the IT environment. It also helps to identify what infrastructure components are important to complete key functions, understand the possible actions an adversary could undertake to damage critical IT infrastructure components, and determine where to look for key indicators of malicious activity.

According to the concepts described herein, a statistical model for predicting an expected path length ("EPL") of the steps of an attacker is described. The model is based on utilizing vulnerability information along with an attack graph. Using the model, it is possible to identify the interaction among vulnerabilities and variables or risk factors that drive the EPL. Having a better understanding of the relationship between the vulnerabilities and their interactions can provide security administrators with a better view and understanding of their security status. Having these estimates at hand, appropriate counter steps can be taken.

Utilizing the statistical model, it is also possible to identify significant interactions of key attributable variables. The attributable variables (e.g., vulnerabilities) can also be ranked to identify a percentage of contribution to the response (e.g., in terms of the EPL and the minimum number of steps to reach the target). Further, one can perform surface response analysis to identify the acceptable values that will minimize the EPL.

Before turning to a more detailed description of the embodiments, certain terminology associated with cyber security is introduced below. Some basic aspects of Markov chains properties are also introduced.

In computer security, a vulnerability is a weakness or flaw in a computer system. Among other factors, a vulnerability can be defined by the intersection of three system elements, including susceptibility to the flaw, attacker access to the flaw, and attacker capability to exploit the flaw. To exploit a vulnerability, an attacker must have at least one applicable tool or technique that can exploit a system weakness. In this context, a vulnerability is also known as an attack surface.

In the context of vulnerabilities, a software vulnerability is an instance of an error in the specification, development, or configuration of software such that its execution can violate a security policy. The attack surface of a software environment is the sum of the different points (the "attack vectors") where an unauthorized user or attacker can try to enter data to or extract data from an environment, for example. Attackers normally use known vulnerabilities listed publicly on the National Vulnerability Database (NVD) to penetrate computing systems. In some cases, attackers can leverage vulnerabilities that have not been disclosed publicly, called zero day vulnerabilities. Zero day vulnerabilities remain unknown to vendors, and such vulnerabilities gives attackers a "free pass" to attack certain hosts.

An attack graph is a succinct representation of various paths through a system that end in a state where an intruder has successfully achieved a goal. Thus, attack graphs describe ways in which an adversary can exploit vulnerabilities to break into a system. System administrators analyze attack graphs to understand where system weaknesses lie and decide which security measures should be deployed for maximum effectiveness.

An attack graph can also be relied upon to examine the logical relationships between multiple exploits. However, when the size and complexity of enterprise networks increase, two major problems occur. First, attack graphs grow exponentially as the size of the networks increase in complexity. Second, the ability to evaluate the information conveyed in the attack graphs becomes more and more difficult. To help with those problems (and others in the field), recent studies have developed some useful statistical models that predict security risks based on various vulnerabilities using the Common Vulnerability Scoring System (CVSS) framework with a Markovian process.

FIG. 1 illustrates organizational aspects of the CVSS framework according to various examples described herein. The CVSS framework provides an open framework for communicating and analyzing the characteristics and impacts of vulnerabilities in computing systems. The CVSS framework is a free and open industry standard for assessing the severity of computer system security vulnerabilities. It is under the custodianship of the Forum of Incident Response and Security Teams (FIRST). It attempts to establish a measure of how much concern a vulnerability warrants, compared to other vulnerabilities, so efforts can be prioritized. The methods described herein can use the metrics defined by the CVSS framework or similar metrics defined by related frameworks.

The quantitative model of the CVSS framework leads to repeatable and accurate measurements while enabling users to see the underlying vulnerability characteristics used to generate vulnerability-related scores. Thus, the CVSS framework is suitable as a standard measurement system for industries, organizations, and governments to accurately and consistently analyze vulnerabilities. Two common uses of the CVSS framework are the prioritization of vulnerability remediation activities and the calculation of the severity of vulnerabilities. The NVD provides CVSS scores for almost all known vulnerabilities.

Risk metrics or scores in the CVSS framework include three metric groups including base, temporal, and environmental metrics or sub-scores, as shown in FIG. 1. The values of base metrics can be assigned by an analyst, determined by a base metric score equation, determined by an equation and adjusted by an analyst, or calculated in other ways. An equation to calculate the base metric score (and the other metrics) can be formed as two sub equations, for example, such as an exploitability sub score equation for the exploitability sub score and an impact sub score equation for the impact sub score. A base metric can be computed as a score ranging from 0.0 to 10.0, for example, but other ranges can be used. As an example, vulnerabilities with a base score range from about 0-3.9 can be considered low vulnerability, 4.0-6.9 can be considered medium vulnerability, and 7.0-10 can be considered high vulnerability.

As noted above and shown in FIG. 1, the base metric or score can be computed using a number of sub-scores, such as exploitability and impact sub-scores. The exploitability metrics or sub-scores are related to the ease and technical means by which a vulnerability can be exploited. The exploitability sub-score can be computed based on a combination of access vector (AV), access complexity (AC), and authentication (AU) sub-scores. For example, the exploitability sub-score can be computed based on an equation or function of the access vector, access complexity, and authentication sub-scores.

The impact metrics or sub-scores are related to the consequences that can occur to components after a successful exploit. The impact sub-score can be computed based on a combination of confidentiality (C), integrity impact (I), and availability impact (A) sub-scores. For example, the impact sub-score can be computed based on an equation or function of confidentiality, integrity impact, and availability impact sub-scores.

Temporal metrics are related to the characteristics of a vulnerability that change over time but not across environments. The temporal metrics can be computed using a number of sub-scores, such as exploitability, remediation level, and report confidence sub-scores. In that context, exploitability is related to how complex the exploitation process is. The remediation level can be related to the number of different measures or solutions available to counteract the vulnerability. The report confidence can be related to the degree of confidence in the existence of the exploitability.

Environmental metrics are related to the characteristics of a vulnerability that are unique to a particular user environment (but might not change over time). The environmental metrics can be computed using a number of sub-scores, such as collateral damage potential and target distribution sub-scores. The collateral damage potential can be related to the potential for loss in or damage to physical property, personal casualties, reputation, or goodwill. The target distribution can be related to the number of target systems susceptible to the vulnerability.

Attackers often penetrate computer networks via a chain of exploits, where each exploit in the chain creates the foundation for an upcoming exploit. A combination (e.g., chain) of such exploits is called an attack path, and a collection of attack paths can be used to develop an attack graph. Thus, an attack graph is representative of all known paths through which an attacker can infiltrate and attack a system. Various algorithms have been developed to construct attack graphs. However, it is relatively difficult to analyze networks using attack graphs, particularly as the number of nodes and complexity of networks increase. As the scalability and complexity of networks increase, the computational costs needed to create and evaluate attack graphs also increases. At the same time, without complicated attack graphs, it might not be possible to analyze the vulnerabilities in complex computing systems.

A Markov chain is one modeling technique that has been used effectively in various fields, such as reliability analysis, performance analysis, dependability analysis, and cybersecurity analysis, among others. As described below, an attack graph can be modeled using a Markov chain with the real behavior of the attacker in conjunction with the Markovian properties.

A discrete type stochastic process $X=\{X_N, N \geq 0\}$ is called a Markov chain if for any sequence of states $\{X_0, X_1, \ldots, X_N\}$, the next state depends only on the current state and not on the sequence of events that preceded it, which is called the Markov property. This property can be mathematically written as follows:

$$P(X_N=j|X_0=i_0, X_1=i_1, \ldots, X_{N-2}=i_{N-2}, X_{N-1}=i)=P(X_N=j|X_{N-1}=i). \quad (1)$$

The Markovian property reveals the fact that the transitions between states are memoryless and that transitioning to the next step depends only on the current state and not on any previous states. This property can be correlated with the behavior of an attacker in the sense that an attacker needs to exploit several nodes before reaching a goal node. When the attacker starts attacking an initial node to reach the goal node, there can be many other nodes, called intermediate nodes, before reaching the goal node. When an attacker reaches any intermediate node, there is no memory of previous nodes. In other words, an assumption can be made that the transition probabilities P of an attack do not depend on time. This is called time homogeneity.

The transition probabilities ($P_{i,j}$) for a Markov chain can be defined as follows:

$$P_{i,j}=P(X_N=J|X_{N-1}=i). \quad (2)$$

The transition probability matrix P of the Markov chain is the N×N matrix whose (i,j) entry $P_{i,j}$ satisfy the following properties:

$$0 \leq P_{ij} \leq 1, 1 \leq i,j \leq N \quad (3)$$

and $$\sum_{j=1}^{N} P_{ij} = 1, 1 \leq i \leq N. \quad (4)$$

Any matrix satisfying Equations (3) and (4) can be a transition state probability matrix P for a Markov chain.

To simulate a Markov chain, the matrix P and an initial probability distribution $\pi_o$ are needed. As one example, an N-state Markov chain (X; P; $\pi_0$) for N=0, 1, 2 . . . N time periods can be simulated. Let X be a vector of possible state values from sample realizations of the chain. Iterating on the Markov chain will produce a sample path $\{X_N\}$ where, for each N, $X_N \in X$. In simulation, this is about using uniformly distributed U [0, 1] random numbers to obtain the corrected distribution in every step.

As for transient states, let P be the transition matrix for the Markov chain $X_n$. A "state i" is called transient state if with probability 1 the chain visits i only a finite number of times. Let Q be the sub matrix of P which includes only the rows and columns for the transient states. The transition matrix for an absorbing Markov chain has the following canonical form:

$$P = \begin{pmatrix} Q & R \\ 0 & I \end{pmatrix}. \quad (5)$$

In Equation (5), P is the transition matrix, Q is the matrix of transient states, R is the matrix of absorbing states, and I is the identity matrix.

The transition matrix P represents the transition probability matrix of the absorbing Markov chain. In an absorbing Markov chain, the probability that the chain will be absorbed is always 1. Hence:

$$Q^n \to 0 \text{ as } n \to \infty. \quad (6)$$

Thus, this implies that all the eigenvalues of Q have absolute values strictly less than 1. Hence, I–Q is an invertible matrix and there is no problem in defining is as:

$$M=(I-Q)^{-1}=I+Q+Q^2+Q^3+ \ldots \quad (7)$$

This matrix is called the fundamental matrix of P. Let i be a transient state and consider $Y_i$, the total number of visits to i. Then, the expected number of visits to i starting at j is given by $M_{ji}$, the (i,j) entry of the matrix M. Therefore, to compute the expected number of steps until the chain enters a recurrent class, assuming starting at state j, only sum $M_{ji}$ over all transient states i.

Figure 2:
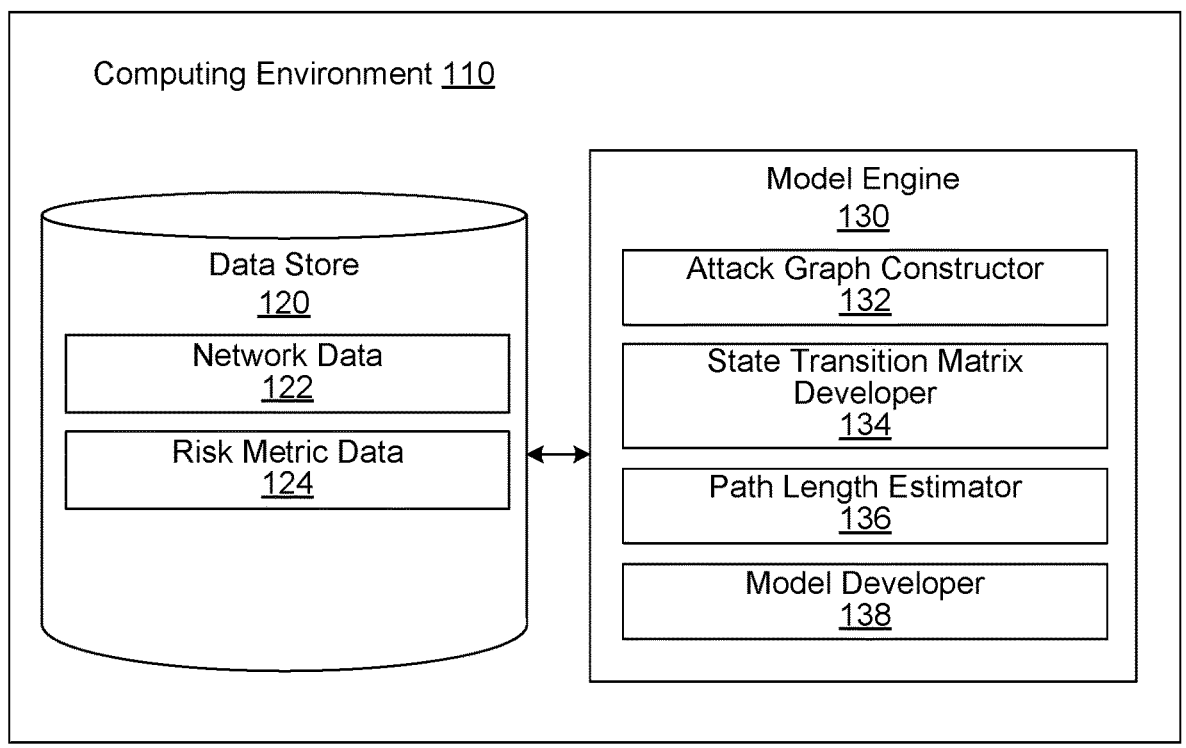
FIG. 2 illustrates a computing environment for the generation of a statistical predictive model for expected path length according to various examples described herein.

FIG. 2 illustrates a computing environment 110 for the generation of a statistical predictive model for expected path length according to various examples described herein. Among other components, the computing environment 110 includes a data store 120 and a model engine 130. Among other data, the data store 120 includes memory areas to store network data 122 and risk metric data 124. The model engine 130 includes an attack graph constructor 132, a state transition matrix developer 134, a path length estimator 136, and a model developer 138, the operation of each of which is described in further detail below.

The computing environment 110 can be embodied as one or more computing devices or systems. In various embodiments, the computing environment 110 can be embodied as a desktop, laptop, server or other type(s) of computing devices or systems. As described herein, the model engine 130 in the computing environment 110 is configured to generate a statistical predictive model for expected path length. The model can be generated to evaluate relatively large networks of computing systems having a number of network nodes. The computing systems and devices in such networks can be located at a single installation site or distributed among different geographical locations. The computing devices in such networks can also include computing devices that together embody a hosted computing resource, a grid computing resource, and/or other distributed computing arrangement.

The computing environment 110 and the network of computing systems evaluated by the computing environment 110 can be coupled to one or more networks embodied by the Internet, intranets, extranets, wide area networks (WANs), local area networks (LANs), wired networks, wireless (e.g., cellular, 802.11-based (WiFi), bluetooth, etc.) networks, cable networks, satellite networks, other suitable networks, or any combinations thereof. The computing environment 110 can communicate with other computing devices and systems using any suitable systems interconnect models and/or protocols. Although not illustrated in FIG. 2, the computing environment 110 can be coupled to any number of network hosts, such as website servers, file servers, network switches, networked computing resources, databases, data stores, and other network or computing platforms.

The network data 122 can include data related to the network of computing systems being evaluated by the model engine 130, which the computing environment 110 may or may not be coupled to. In that context, the network data 122 can define the types of network and computing devices and systems being evaluated by the model engine 130, such as the serial numbers, model numbers, operating system versions, services, and other identifying information. The network data 122 can also specify the logical arrangement of those devices among each other, including the network connections between them. The network data 122 can include all the information necessary for the attack graph constructor 132 to generate an attack graph as described herein.

The risk metric data 124 can include a number of risk metrics, including CVSS and CVE data among other risk metric data, associated with devices specified in the network data 122. As one example, according to the CVSS framework, the risk metrics can include base, temporal, and environmental metrics, among others, for the devices specified in the network data 122. However, the risk metric data 124 is not limited to the types of metrics used in the CVSS framework, as other types and formats of risk metrics can be relied upon.

The attack graph constructor 132 is configured to construct attack graphs based on the network data 122. The network topology information defined in the network data 122 can include serial numbers, model numbers, operating system versions, services, and other identifying information. The network topology information can also specify the logical arrangement of host devices among each other, including the network connections between them. The network topology information can specify a number of hosts in enterprise systems, services running on each host in the network, rules defined on firewalls, network switches, etc., and vulnerabilities associated with each host and service among other topology information. For simplicity, a limited number of nodes are present in the examples described herein, but attack graphs of any size can be used. In the attack graphs described herein, each node can be representative of any of the above-described (or related) types of host computing devices, systems, or services. Each host can include various types of vulnerabilities.

Once an attack graph is created, vulnerability scores can be assigned to the vulnerabilities of the hosts in the attack graph using information from the risk metric data 124, such as CVSS framework metric data. The scores can be computed based on a number of scores and sub-scores, such as those shown in FIG. 1, for example, using one or more expressions, equations, or sub-equations that relate them. In some cases, one or more standard expressions can be used to calculate scores based on matrices that provide a quantitative score to approximate the ease and/or impact of the vulnerabilities in the nodes. The exploitability and impact sub-scores, for example, can also be combined to provide the basis of assigning scores to directed connections among the nodes in attack graphs as probabilities. Those probabilities can represent the possibility of a vulnerability being exploited by an attacker.

Figure 3:
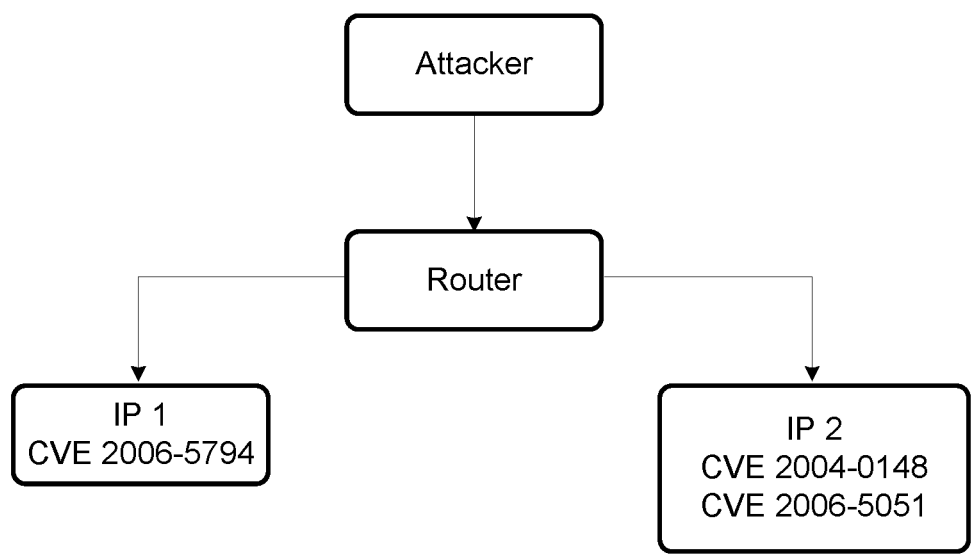
FIG. 3 illustrates an example network topology according to various examples described herein.

FIG. 3 illustrates an example network topology to provide context for the proposed model described herein. The network consists of two server hosts, IP 1 and IP 2, and the workstation of an attacker connecting to each of the hosts via a central router. In the server IP 1, the vulnerability is labeled CVE 2006-5794 and is considered $V_1$. In the server IP 2, there are two vulnerabilities labeled CVE 2004-0148 and CVE 2006-5051, considered $V_2$ and $V_3$, respectively.

A core component of the model and methods described herein is the attack graph. An attack graph for a computing system can include several state nodes, which represent the system vulnerabilities and the state of an attacker with respect to those vulnerabilities. A node in the attack graph is representative of a computing device or system in the networked computing environment. A directed connection (e.g., arrowed line) between two nodes represents the access relationship between the nodes. Each node can be representative of a different type of computing device, such as a server, desktop, laptop, handheld, or other type of computing system. The nodes can also be representative of other types of network devices including network switches, routers, firewalls, and other devices. In some cases, the nodes can also be representative of one or more software services executing on one or more computing devices.

An attack graph can also include at least one absorbing or goal state. In the attack graph, it can be possible to go to the goal state node starting from any other state in the attack graph. Therefore, the attack graph can be modeled as an absorbing Markov chain. The absorbing or goal state node is the security node which is exploited by the attacker. When the attacker has reached this goal state, the attack path is completed. Thus, the entire attack graph consists of these type of attack paths.

Figure 4:
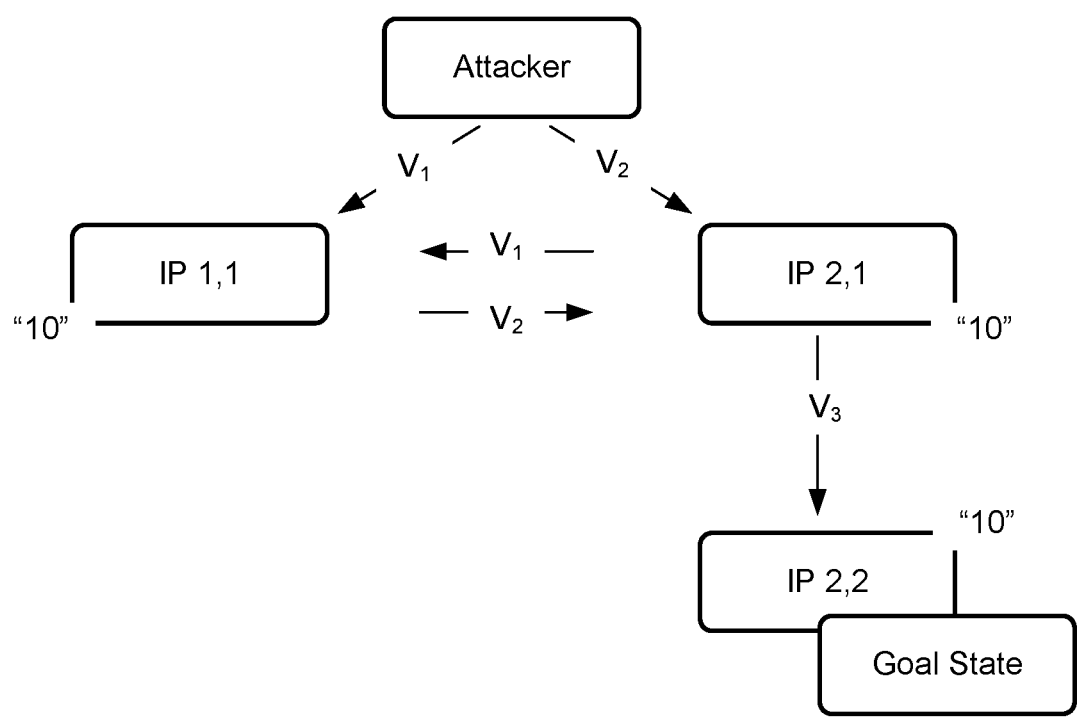
FIG. 4 illustrates an example attack graph according to various examples described herein.

FIG. 4 illustrates an example attack graph according to various examples described herein. The attack graph constructor 132 can construct the attack graph shown in FIG. 4 based on the structure and arrangement of the network topology shown in FIG. 3 in this example. The network topology information can be stored in the network data 122, for example, can include serial numbers, model numbers, operating system versions, services, and other identifying information. The network topology information can also specify the logical arrangement of host devices among each other, including the network connections between them. The network topology information can specify a number of hosts in enterprise systems, services running on each host in the network, rules defined on firewalls, network switches, etc., and vulnerabilities associated with each host and service among other topology information. Once the attack graph is constructed by the attack graph constructor 132, then the basic foundation is developed for further analysis by the state transition matrix developer 134, the path length estimator 136, and the model developer 138.

The attack graph in FIG. 4 shows all the possible paths that the attacker can follow to reach the goal state node. The IP1,1 state represents the $V_1$ vulnerability and the IP2,1 and IP2,2 states represent the $V_2$ and $V_3$ vulnerabilities, respectively. Also, the notation "10" represents the maximum vulnerability score and this provides attacker the maximum chance to exploit this state. The attacker can reach each state by exploiting the relevant vulnerability. In FIG. 4, an attacker can reach the goal state node by exploiting the $V_2$ vulnerability and the $V_3$ vulnerability.

Given the attack graph shown in FIG. 4, the state transition matrix developer 134 can develop or construct a state transition probability matrix based, for example, on the CVSS score of each of the vulnerabilities in the attack graph. The state transition matrix can be used to evaluate the probabilities that an attacker will transition among the state nodes in the attack graph based on the vulnerabilities. The transition probabilities among the state nodes can be estimated through an absorbing Markov chain by normalizing the CVSS scores over all the edges starting from the source state node of the attacker.

In Equation (8) below, $p_{ij}$ is the probability that an attacker is currently in state j and exploits a vulnerability in state i, n is number of outgoing edges from state i in the attack graph, and $v_j$ is the CVSS score for the vulnerability in state j. Formally, the transition probability can be defined as:

$$pij = \frac{v_j}{\sum_{k=1}^{n} v_k}. \quad (8)$$

By using these state transition probabilities, the state transition matrix developer 134 can also derive an absorbing transition probability matrix P, which follows the properties defined under the Markov chain probability method.

Under the attack prediction, two methods to predict behavior of an attacker can be considered. For multi-step attack prediction, the absorbing transition probability matrix shows the presence of each edge in a network attack graph. This matrix shows every single-step attack. In other words, the absorbing transition probability matrix shows attacker reachability within one attack step. The absorbing transition probability matrix can be navigated by iteratively matching rows and columns to follow multiple attack steps, and also raise the absorbing transition probability matrix to higher powers, which shows multi-step attacker reachability at a glance.

For a square (n×n) matrix P and a positive integer k, $P^k$ is P raised to the power k. Since P is an absorbing transition probability matrix with time, this matrix goes to some stationary matrix Π, where the rows of this matrix are identical. That is:

$$\lim_{k \to \infty} P^k = \Pi. \quad (9)$$

The goal state column of this matrix Π has ones, so the minimum number of steps that the attacker should try to reach to the goal state with the probability of 1 can be found.

The path length estimator 136 is configured to measure the expected number of steps the attacker will take starting from the initial state to reach the goal state, which is the objective of the attacker. As described earlier, transition probability matrix P can have the canonical form shown in Equation (5). The transition probability matrix P represents the transition probability matrix of the absorbing Markov chain. In an absorbing Markov chain, the probability that the chain will be absorbed is always 1 according to Equation (6). This implies that all the eigenvalues of Q have absolute values strictly less than 1. Hence, I−Q is an invertible matrix and there is no problem in defining it as shown in Equation (7).

Using this fundamental matrix M of the absorbing Markov chain from Equation (7), the path length estimator 136 can compute the expected total number of steps to reach the goal state until absorption. Taking the summation of first row elements of matrix M gives the expected total number of steps to reach the goal state until absorption, and the probability value related to the goal state gives the expected number of visits to that state before absorption.

To illustrate the proposed model described above, the network topology illustrated in FIG. 3 can be considered. The network consists of two server hosts, IP 1 and IP 2, and the workstation of an attacker connecting to each of the hosts via a central router. In the server IP 1, the vulnerability is labeled CVE 2006-5794 and is considered $V_1$. In the server IP 2, there are two recognized vulnerabilities labeled CVE 2004-0148 and CVE 2006-5051, considered $V_2$ and $V_3$, respectively.

CVSS scores can be used in connection with the vulnerabilities identified in FIG. 3. In this example, the exploitability score of each vulnerability is given in Table 1 below.

TABLE 1

| Vulnerability Scores | |
|---|---|
| Vulnerability | Exploitability score |
| $V_1$(CVE 2006-5794) | 6 |
| $V_2$(CVE 2006-5051) | 5 |
| $V_3$(CVE 2004-0148) | 1 |

Here, the attacker can reach the goal state by exploiting the $V_2$ vulnerability. The attach graph in FIG. 4 shows all the possible paths that an attacker can follow to reach the goal state. The IP1,1 state represents the $V_1$ vulnerability and the IP2,1 and IP2,2 states represent the $V_2$ and $V_3$ vulnerabilities, respectively. Also, the notation "10" represents the maximum vulnerability score and this provides attacker the maximum chance to exploit this state. The attacker can reach each state by exploiting the relevant vulnerability.

As for the transition probability matrix P for the attack graph shown in FIG. 4, let $s_1$, $s_2$, $s_3$, $s_4$, represent the attack states for the attacker, (IP1,1), (IP2,1), and (IP2,2), respectively. To find the weighted value of exploiting each vulnerability from one state to another state, the vulnerability score can be divided by the summation of all out going vulnerability values from that state.

For the attack graph, the weighted value of exploiting each vulnerability is given below.

$1^{st}$ Row Probabilities:

Weighted value of exploiting $V_1$ from $s_1$ to $s_2$ is $V_1/(V_1+V_2)$

Weighted value of exploiting $V_2$ from $s_1$ to $s_3$ is $V_2/(V_1+V_2)$ $2^{nd}$ Row Probabilities:

Weighted value of exploiting $V_2$ from $s_2$ to $s_3$ is $V_2/(10+V_2)$ $3^{rd}$ Row Probabilities:

Weighted value of exploiting $V_1$ from $s_3$ to $s_2$ is $V_1/(V_1+V_3+10)$

Weighted value of exploiting $V_3$ from $s_3$ to $s_4$ is $V_3/(V_1+V_3+10)$ $4^{th}$ Row Probabilities:

Weighted value of exploiting $V_3$ from $s_4$ to $s_4$ is 1

For the attack graph, the adjacency matrix can be as follows:

$$A = \begin{array}{c} \\ s_1 \\ s_2 \\ s_3 \\ s_4 \end{array} \begin{array}{cccc} s_1 & s_2 & s_3 & s_4 \end{array} \left[ \begin{array}{cccc} 0 & \frac{V1}{v1+v2} & \frac{V2}{v1+v2} & 0 \\ \frac{0}{10+v2} & \frac{10}{10+v2} & \frac{V2}{10+v2} & \frac{0}{10+v2} \\ 0 & V1 & 10 & V3 \\ \frac{}{v1+v3+10} & \frac{}{v1+v3+10} & \frac{}{v1+v3+10} & \frac{}{v1+v3+10} \\ 0 & 0 & 0 & 1 \end{array} \right]. \quad (12)$$

Utilizing the information given in Table 1, the matrix A can be given by:

$$A = \begin{bmatrix} 0 & 0.5455 & 0.4545 & 0 \\ 0 & 0.6667 & 0.3333 & 0 \\ 0 & 0.3529 & 0.5882 & 0.0588 \\ 0 & 0 & 0 & 1 \end{bmatrix}. \quad (13)$$

Here, 0.5455 is the probability that the attacker exploits the $V_1$ vulnerability in the first step, from $s_1$ to $s_2$. Further 0.0588 is the probability that once in state IP2,1 the attacker can exploit the $V_3$ vulnerability and reach to IP2,2 in first attempt. Similarly, each probability represents the chance of exploiting the vulnerability from one state in the first attempt.

The matrix A can be used as a cyber security analysis tool. It can be used to find the minimum number of steps needed for an attacker to reach the goal state node in the attack graph with a probability of one, and the EPL metric. For example, the matrix A can be used to find the probabilities with two, three, and several attempts by the attacker to reach the goal state using $A^2, A^3, A^4, \ldots, A^p$ matrices. These matrices can be used to find all possible probabilities from one state to another that the attacker can reach by two steps $A^2$, three steps $A^3$, four steps $A^4$, etc., up top steps $A^p$, respectively. This process can be continued until the absorbing matrix is reached, and that p value gives the minimum number of steps that the attacker is required to reach the goal state with a probability of one.

Thus, the path length estimator 136 is also configured to change or vary the vulnerability scores being modeled. For each combination of $V_1$, $V_2$, and $V_3$, the path length estimator 136 can estimate the minimum number of steps that the attacker will take to reach the goal state node of the attack graph with a probability of one. An example of these calculations are given in Table 2 below.

TABLE 2

Number of Steps for Absorbing Matrix

| # of steps | $V_1$ | $V_2$ | $V_3$ | # of steps | $V_1$ | $V_2$ | $V_3$ | # of steps | $V_1$ | $V_2$ | $V_3$ |
|---|---|---|---|---|---|---|---|---|---|---|---|
| 68 | 10 | 9 | 8 | 407 | 9 | 8 | 1 | 92 | 7 | 6 | 5 |
| 75 | 10 | 9 | 7 | 87 | 9 | 7 | 6 | 109 | 7 | 6 | 4 |
| 85 | 10 | 9 | 6 | 100 | 9 | 7 | 5 | 138 | 7 | 6 | 3 |
| 99 | 10 | 9 | 5 | 121 | 9 | 7 | 4 | 197 | 7 | 6 | 2 |
| 119 | 10 | 9 | 4 | 154 | 9 | 7 | 3 | 374 | 7 | 6 | 1 |
| 153 | 10 | 9 | 3 | 222 | 9 | 7 | 2 | 118 | 7 | 5 | 4 |
| 221 | 10 | 9 | 2 | 424 | 9 | 7 | 1 | 149 | 7 | 5 | 3 |
| 424 | 10 | 9 | 1 | 107 | 9 | 6 | 5 | 212 | 7 | 5 | 2 |
| 78 | 10 | 8 | 7 | 128 | 9 | 6 | 4 | 400 | 7 | 5 | 1 |
| 88 | 10 | 8 | 6 | 163 | 9 | 6 | 3 | 165 | 7 | 4 | 3 |
| 102 | 10 | 8 | 5 | 234 | 9 | 6 | 2 | 233 | 7 | 4 | 2 |
| 124 | 10 | 8 | 4 | 447 | 9 | 6 | 1 | 439 | 7 | 4 | 1 |
| 159 | 10 | 8 | 3 | 138 | 9 | 5 | 4 | 269 | 7 | 3 | 2 |
| 229 | 10 | 8 | 2 | 176 | 9 | 5 | 3 | 504 | 7 | 3 | 1 |
| 439 | 10 | 8 | 1 | 252 | 9 | 5 | 2 | 634 | 7 | 2 | 1 |
| 93 | 10 | 7 | 6 | 480 | 9 | 5 | 1 | 107 | 6 | 5 | 4 |
| 107 | 10 | 7 | 5 | 195 | 9 | 4 | 3 | 135 | 6 | 5 | 3 |
| 129 | 10 | 7 | 4 | 279 | 9 | 4 | 2 | 191 | 6 | 5 | 2 |
| 166 | 10 | 7 | 3 | 529 | 9 | 4 | 1 | 359 | 6 | 5 | 1 |
| 239 | 10 | 7 | 2 | 323 | 9 | 3 | 2 | 149 | 6 | 4 | 3 |
| 458 | 10 | 7 | 1 | 610 | 9 | 3 | 1 | 210 | 6 | 4 | 2 |
| 114 | 10 | 6 | 5 | 774 | 9 | 2 | 1 | 393 | 6 | 4 | 1 |
| 137 | 10 | 6 | 4 | 81 | 8 | 7 | 6 | 242 | 6 | 3 | 2 |
| 176 | 10 | 6 | 3 | 93 | 8 | 7 | 5 | 450 | 6 | 3 | 1 |
| 253 | 10 | 6 | 2 | 112 | 8 | 7 | 4 | 564 | 6 | 2 | 1 |
| 484 | 10 | 6 | 1 | 143 | 8 | 7 | 3 | 134 | 5 | 4 | 3 |
| 148 | 10 | 5 | 4 | 205 | 8 | 7 | 2 | 187 | 5 | 4 | 2 |
| 190 | 10 | 5 | 3 | 390 | 8 | 7 | 1 | 348 | 5 | 4 | 1 |
| 272 | 10 | 5 | 2 | 99 | 8 | 6 | 5 | 215 | 5 | 3 | 2 |
| 520 | 10 | 5 | 1 | 119 | 8 | 6 | 4 | 396 | 5 | 3 | 1 |

TABLE 2-continued

Number of Steps for Absorbing Matrix

| # of steps | $V_1$ | $V_2$ | $V_3$ | # of steps | $V_1$ | $V_2$ | $V_3$ | # of steps | $V_1$ | $V_2$ | $V_3$ |
|---|---|---|---|---|---|---|---|---|---|---|---|
| 211 | 10 | 4 | 3 | 151 | 8 | 6 | 3 | 493 | 5 | 2 | 1 |
| 301 | 10 | 4 | 2 | 216 | 8 | 6 | 2 | 187 | 4 | 3 | 2 |
| 574 | 10 | 4 | 1 | 411 | 8 | 6 | 1 | 342 | 4 | 3 | 1 |
| 350 | 10 | 3 | 2 | 128 | 8 | 5 | 4 | 423 | 4 | 2 | 1 |
| 664 | 10 | 3 | 1 | 163 | 8 | 5 | 3 | 351 | 3 | 2 | 1 |
| 844 | 10 | 2 | 1 | 232 | 8 | 5 | 2 | | | | |
| 74 | 9 | 8 | 7 | 440 | 8 | 5 | 1 | | | | |
| 83 | 9 | 8 | 6 | 180 | 8 | 4 | 3 | | | | |
| 96 | 9 | 8 | 5 | 256 | 8 | 4 | 2 | | | | |
| 115 | 9 | 8 | 4 | 484 | 8 | 4 | 1 | | | | |
| 148 | 9 | 8 | 3 | 296 | 8 | 3 | 2 | | | | |
| 212 | 9 | 8 | 2 | 557 | 8 | 3 | 1 | | | | |

For example, it will take a minimum of 68 steps with a vulnerability configuration of $V_1$=10, $V_2$=9, and $V_3$=8 for the attacker to reach the final goal with a probability of one. The largest number of steps for the attacker to achieve his goal is 844 steps using the vulnerabilities $V_1$=10, $V_2$=2, and $V_3$=1.

As for the EPL analysis, the path length estimator 136 can find a measurement of the expected number of steps the attacker will take from the initial state to compromise the security goal. Table 3 presents the calculations of the EPL of the attacker for various combinations of the vulnerabilities $V_1$, $V_2$, and $V_3$.

TABLE 3

Expected Path Length for several Vulnerabilities

| Expected path length | $V_1$ | $V_2$ | $V_3$ | Expected path length | $V_1$ | $V_2$ | $V_3$ |
|---|---|---|---|---|---|---|---|
| 8.25 | 10 | 9 | 8 | 34.25 | 9 | 3 | 2 |
| 8.98 | 10 | 9 | 7 | 63.25 | 9 | 3 | 1 |
| 9.96 | 10 | 9 | 6 | 79.91 | 9 | 2 | 1 |
| 11.33 | 10 | 9 | 5 | 9.53 | 8 | 7 | 6 |
| 13.39 | 10 | 9 | 4 | 10.78 | 8 | 7 | 5 |
| 16.81 | 10 | 9 | 3 | 12.65 | 8 | 7 | 4 |
| 23.67 | 10 | 9 | 2 | 15.77 | 8 | 7 | 3 |
| 44.22 | 10 | 9 | 1 | 22.01 | 8 | 7 | 2 |
| 9.32 | 10 | 8 | 7 | 40.72 | 8 | 7 | 1 |
| 10.33 | 10 | 8 | 6 | 11.39 | 8 | 6 | 5 |
| 11.75 | 10 | 8 | 5 | 13.36 | 8 | 6 | 4 |
| 13.87 | 10 | 8 | 4 | 16.64 | 8 | 6 | 3 |
| 17.42 | 10 | 8 | 3 | 23.19 | 8 | 6 | 2 |
| 24.5 | 10 | 8 | 2 | 42.86 | 8 | 6 | 1 |
| 45.75 | 10 | 8 | 1 | 14.35 | 8 | 5 | 4 |
| 10.81 | 10 | 7 | 6 | 17.85 | 8 | 5 | 3 |
| 12.29 | 10 | 7 | 5 | 24.85 | 8 | 5 | 2 |
| 14.5 | 10 | 7 | 4 | 45.85 | 8 | 5 | 1 |
| 18.19 | 10 | 7 | 3 | 19.67 | 8 | 4 | 3 |
| 25.57 | 10 | 7 | 2 | 27.33 | 8 | 4 | 2 |
| 47.71 | 10 | 7 | 1 | 50.33 | 8 | 4 | 1 |
| 13 | 10 | 6 | 5 | 31.48 | 8 | 3 | 2 |
| 15.33 | 10 | 6 | 4 | 57.82 | 8 | 3 | 1 |
| 19.22 | 10 | 6 | 3 | 72.8 | 8 | 2 | 1 |
| 27 | 10 | 6 | 2 | 10.57 | 7 | 6 | 5 |
| 50.33 | 10 | 6 | 1 | 12.35 | 7 | 6 | 4 |
| 16.5 | 10 | 5 | 4 | 15.32 | 7 | 6 | 3 |
| 20.67 | 10 | 5 | 3 | 21.27 | 7 | 6 | 2 |
| 29 | 10 | 5 | 2 | 39.1 | 7 | 6 | 1 |
| 54 | 10 | 5 | 1 | 13.25 | 7 | 5 | 4 |
| 22.83 | 10 | 4 | 3 | 16.42 | 7 | 5 | 3 |
| 32 | 10 | 4 | 2 | 22.75 | 7 | 5 | 2 |
| 59.5 | 10 | 4 | 1 | 41.75 | 7 | 5 | 1 |
| 37 | 10 | 3 | 2 | 18.06 | 7 | 4 | 3 |
| 68.67 | 10 | 3 | 1 | 24.98 | 7 | 4 | 2 |
| 87 | 10 | 2 | 1 | 45.73 | 7 | 4 | 1 |
| 8.798 | 9 | 8 | 7 | 28.7 | 7 | 3 | 2 |

TABLE 3-continued

Expected Path Length for several Vulnerabilities

| Expected path length | $V_1$ | $V_2$ | $V_3$ | Expected path length | $V_1$ | $V_2$ | $V_3$ |
|---|---|---|---|---|---|---|---|
| 9.73 | 9 | 8 | 6 | 52.37 | 7 | 3 | 1 |
| 11.04 | 9 | 8 | 5 | 65.67 | 7 | 2 | 1 |
| 13 | 9 | 8 | 4 | 12.14 | 6 | 5 | 4 |
| 16.27 | 9 | 8 | 3 | 14.97 | 6 | 5 | 3 |
| 22.82 | 9 | 8 | 2 | 20.64 | 6 | 5 | 2 |
| 42.44 | 9 | 8 | 1 | 37.64 | 6 | 5 | 1 |
| 10.18 | 9 | 7 | 6 | 16.43 | 6 | 4 | 3 |
| 11.54 | 9 | 7 | 5 | 22.6 | 6 | 4 | 2 |
| 13.58 | 9 | 7 | 4 | 41.1 | 6 | 4 | 1 |
| 16.99 | 9 | 7 | 3 | 25.89 | 6 | 3 | 2 |
| 23.79 | 9 | 7 | 2 | 46.89 | 6 | 3 | 1 |
| 44.22 | 9 | 7 | 1 | 58.5 | 6 | 2 | 1 |
| 12.2 | 9 | 6 | 5 | 14.78 | 5 | 4 | 3 |
| 14.35 | 9 | 6 | 4 | 20.19 | 5 | 4 | 2 |
| 17.93 | 9 | 6 | 3 | 36.44 | 5 | 4 | 1 |
| 25.1 | 9 | 6 | 2 | 23.04 | 5 | 3 | 2 |
| 46.6 | 9 | 6 | 1 | 41.38 | 5 | 3 | 1 |
| 15.43 | 9 | 5 | 4 | 51.29 | 5 | 2 | 1 |
| 19.26 | 9 | 5 | 3 | 20.14 | 4 | 3 | 2 |
| 26.93 | 9 | 5 | 2 | 35.81 | 4 | 3 | 1 |
| 49.93 | 9 | 5 | 1 | 44 | 4 | 2 | 1 |
| 21.26 | 9 | 4 | 3 | 36.6 | 3 | 2 | 1 |
| 29.67 | 9 | 4 | 2 | | | | |
| 54.92 | 9 | 4 | 1 | | | | |

For example, it will take 8.25 EPL with vulnerability configuration of $V_1=10$, $V_2=9$, $V_3=8$ for the attacker to compromise the security goal. The largest EPL of the attacker is 72.8 using $V_1=8$, $V_2=2$ and $V_3=1$.

One primary objective is to utilize the information calculated to develop a statistical model to predict the minimum number of steps to reach the stationary matrix and EPL of the attacker. Various application software packages can be used for calculations in developing these models.

By using the information in the tables above, the model developer 140 is configured to develop a statistical model that estimates the minimum number of steps the attacker takes to reach the goal state with a probability of one. Three example models are identified in Table 4 below.

TABLE 4

Parametric Model: $R^2$ and adjusted $R^2$ Values

| Model | $R^2$ | Adjusted $R^2$ |
|---|---|---|
| Y1 = 344.167 + 35.284$V_1$ − 34.115$V_2$ − 67.803$V_3$ | 0.7244 | 0.7173 |
| Y2 = 446.865 + 67.645$V_1$ − 81.662$V_2$ − 149.982$V_3$ − 1.24$V_1V_2$ − 13.7$V_1V_3$ + 29.354$V_2V_3$ | 0.8835 | 0.8773 |
| Y3 = 689.84 + 51.177$V_1$ − 138.815$V_2$ − 328.093$V_3$ − 0.3626$V_1V_2$ + 9.29$V_1V_3$ + 39.114$V_2V_3$ − 0.084$V_1^2$ + 8.479 $V_2^2$ + 17.96 $V_3^2$ − 3.47$V_1V_2V_3$ | 0.9428 | 0.9376 |

The quality of each model is measured by the $R^2$ and adjusted $R^2$ values as described below. The first model shown in Table 4 does not include interactions of the three vulnerabilities $V_1$, $V_2$, and $V_3$, and $R^2$ and $R^2_{adj}$ reflect its quality of 0.7244 and 0.7173. The second model shows that there is a significant binary interaction of each of the factors and the statistical model shows a significant improvement with $R^2$ and $R^2_{adj}$ of 0.8835 and 0.8773, respectively. However, a better statistical model can be obtained by considering, in addition to individual contributions of $V_1$, $V_2$, and $V_3$, two way and three way significant interactions. Thus, from table above, the third model with $R^2$ and $R^2_{adj}$ of 0.9428 and 0.9376, respectively, attest to the fact that this statistical model is good for estimating the minimum number of steps that an attacker will need to achieve his goal.

By using the results in Table 3, the model developer 140 is also configured to develop a model to find the EPL that the attacker will take starting from the initial state to reach the security goal. Example models are identified in Table 5 below.

TABLE 5

Parametric model (EPL) $R^2$ and adjusted $R^2$ Values

| Model | $R^2$ | Adjusted $R^2$ |
|---|---|---|
| Y1 = 35.975 + 3.622$V_1$ − 3.497$V_2$ − 6.845$V_3$ | 0.7253 | 0.7181 |
| Y2 = 46.301 + 6.904$V_1$− 8.28$V_2$ − 15.178$V_3$ − 0.128$V_1V_2$ − 1.384$V_1V_3$ + 2.97$V_2V_3$ | 0.8839 | 0.8778 |
| Y3 = 70.62 + 5.338$V_1$ − 14.108$V_2$ − 33.144$V_3$ − 0.041$V_1V_2$ + 0.942$V_1V_3$ + 3.943$V_2V_3$ − 0.015$V_1^2$ + 0.864$V_2^2$ + 1.814 $V_3^2$ − 0.35$V_1V_2V_3$ | 0.943 | 0.9378 |

Evaluating the models using the $R^2$ concept and comparing the values in Table 5, the third model gives the highest $R^2$ and $R^2_{adj}$ value. Therefore, the third model gives the best prediction of EPL.

From the comparison shown in Table 6 below, the proposed statistical model gives accurate predictions.

TABLE 6

Error Calculation of Parametric/Statistical Model (EPL) and Markov Model

| Parametric value | Markov Value | Error |
|---|---|---|
| 9.099 | 9.96 | 0.861 |
| 43.596 | 44.22 | 0.624 |
| 61.487 | 63.25 | 1.763 |
| 39.62 | 42.86 | 3.24 |
| 49.91 | 51.29 | 1.38 |
| 43.68 | 44 | 0.32 |
| 10.49 | 10.57 | 0.08 |

In Table 7 below, the most important attributable variables with respect to their contribution to estimate the EPL are presented and ranked.

TABLE 7

Ranking Contribution the Variables According to

| Variable | Rank |
|---|---|
| $V_3^2$ | 1 |
| $V_3$ | 2 |
| $V_2$ | 3 |
| $V_2^2$ | 4 |
| $V_2V_3$ | 5 |
| $V_1V_2V_3$ | 6 |
| $V_1$ | 7 |
| $V_1V_3$ | 8 |
| $V_1V_2$ | 9 |
| $V_1^2$ | 10 |

As shown in Table 7, the most attributable variable (e.g., vulnerability) is $V_3$ in quadratic form and individually. Whereas the minimum risk factor is the vulnerability $V_1$. Thus, this ranking can be used to take precautionary measures addressing the most dangerous vulnerability or vulnerabilities with priority.

Figure 5:
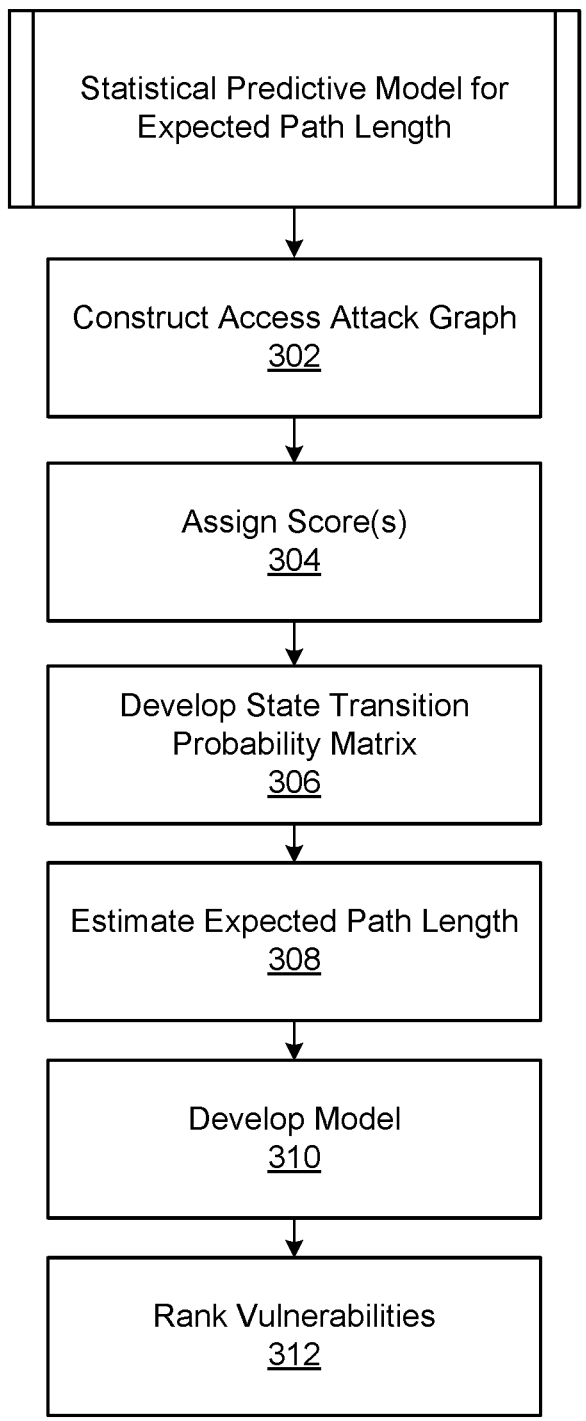
FIG. 5 illustrates a process for the generation of a statistical predictive model for expected path length according to various examples described herein.

FIG. 5 illustrates a process for the generation of a statistical predictive model for expected path length. The process flowchart in FIG. 5 can be viewed as depicting example steps performed by the computing environment 110, although other computing systems and environments can perform the process. The flowchart in FIG. 5 provides merely one example of a functional sequence or arrangement of steps that can be employed to implement the processes for predictive modeling and risk ranking described herein. Although the processes are described in connection with the computing environment 110, other computing environments, systems, and/or devices can perform the processes. Additionally, although not explicitly stated below, among each of the process steps described, any number of intermediate data accessing, storing, and logging steps can be performed.

At step 302, the process can include the attack graph constructor 132 constructing a host access attack graph. The host access attack graph can be constructed based on data stored in the network data 122, for example, according to characteristics of a network of computing systems. The host access attack graph can include a plurality of nodes such as those shown in FIG. 4, based on the structure of the network of computing systems shown in FIG. 3, for example.

At step 304, the process can include the state transition matrix developer 134 gathering and assigning security or vulnerability metrics related to one or more of the nodes in the host access attack graph. The metrics may be gathered and assigned from the risk metric data 124 or from another computing system via network communications. As one example, the state transition matrix developer 134 can gather exploitability scores and impact scores associated with the nodes in the host access attack graph. The exploitability and impact scores can be CVSS scores or other scores developed according to another vulnerability scoring system.

At step 306, the process can include the state transition matrix developer 134 developing a state transition probability matrix based on the scores gathered at step 304 and the host access attack graph constructed at step 302. In one example, the state transition matrix developer 134 can develop the state transition probability matrix as described above with reference to the exploitability scores and the impact scores.

At step 308, the process can include the path length estimator 136 estimating an expected path length (EPL) of an attacker of the network of computing systems based on the state transition probability matrix developed in step 306. The EPL can correspond to a number of steps the attacker will take starting from an initial state node to a goal state node in the attack graph.

At step 310, the process can include the model developer 138 developing a model to find the EPL of the attacker as described above. The model can be generated to evaluate relatively large networks of computing systems having a number of network nodes.

At step 312, the process can include the model engine 130 ranking the vulnerability associated with each of the plurality of nodes in the attack graph constructed at step 302 among each other with respect to contribution to the EPL. The nodes can be ranked to identify a percentage of contribution to the response (e.g., in terms of the EPL and the minimum number of steps to reach the target). This ranking can be used to take precautionary measures addressing the most dangerous vulnerability or vulnerabilities with priority.

Thus, an accurate statistical model is described herein. The model can be utilized to predict the minimum steps to reach a goal state and predict an expected path length. This model can be used to identify the interaction among the vulnerabilities and individual variables that drive the EPL. The attributable variables and their contribution in estimating the subject length can be ranked. By using these rankings, security administrators can have a better knowledge about priorities. This will help them to take the necessary actions regarding their security system.

Turning to FIG. 7B, the risk ranking process includes creating a risk vector with initial risk values at step 310. As described above, a risk vector R and its initial risk values can be computed based on the number of hosts present in the host access attack graph. If N nodes exist in the host access attack graph, then the rank of all nodes can be equal to 1/N.

At step 312, the process includes the risk ranking engine 136 iterating the risk vector from step 310 with the state transition probability matrix developed at step 306. When the ranking process is started, the intermediate risk value or values are computed via iteration. The intermediate values will flow, level by level, until a steady state is achieved according to Equations (6)-(8) above.

At step 314, it is assumed that the iterating at step 312 has converged, and the risk vector includes a number of risk elements, each representative of the risk of a respective node in the host access attack graph. Using this converged risk vector, the process can include the risk ranking engine 136 prioritizing the risk associated with each node at step 316 by ranking them based on the level of risk of each. In other words, a node associated with a higher level of risk can be prioritized for remediation over a node associated with a relatively lower level of risk.

Finally, at step 318, the process can include the risk ranking engine 136 computing a total risk for the network of computing systems being evaluated. The total risk can be calculated based on a total risk for all the elements in the risk vector, for example. Thus, the risks of all the nodes are summed to give a total security risk present in the network of computing systems.

Figure 6:
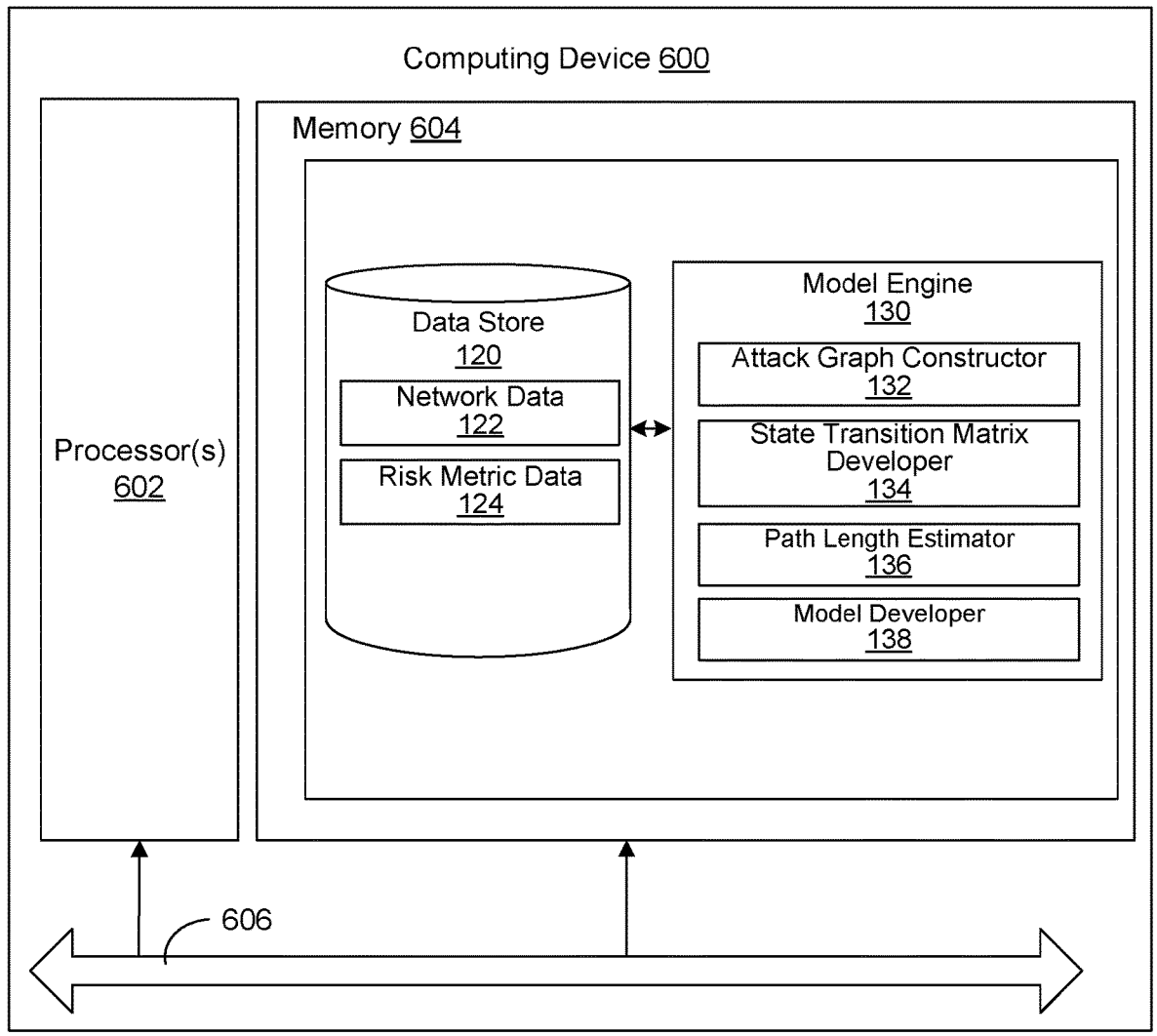
FIG. 6 illustrates an example schematic block diagram of a computing device for the computing environment shown in FIG. 2 according to various embodiments described herein.

FIG. 6 illustrates an example schematic block diagram of a computing device 600 for the computing environment 110 shown in FIG. 2 according to various embodiments described herein. The computing device 600 includes at least one processing system, for example, having a processor 602 and a memory 604, both of which are electrically and communicatively coupled to a local interface 606. The local interface 606 can be embodied as a data bus with an accompanying address/control bus or other addressing, control, and/or command lines.

In various embodiments, the memory 604 stores data and software or executable-code components executable by the processor 602. For example, the memory 604 can store executable-code components associated with the model engine 130 for execution by the processor 602. The memory 604 can also store data such as that stored in the data store 120, among other data.

It is noted that the memory 604 can store other executable-code components for execution by the processor 602. For example, an operating system can be stored in the memory 604 for execution by the processor 602. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 604 stores software for execution by the processor 602. In this respect, the terms "executable" or "for execution" refer to software forms that can ultimately be run or executed by the processor 602, whether in source, object, machine, or other form. Examples of executable programs include, for example, a compiled program that can be translated into a machine code format and loaded into a random access portion of the memory 604 and executed by the processor 602, source code that can be expressed in an object code format and loaded into a random access portion of the memory 604 and executed by the processor 602, or source code that can be interpreted by another executable program to generate instructions in a random access portion of the memory 604 and executed by the processor 602, etc.

An executable program can be stored in any portion or component of the memory 604 including, for example, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or other types of memory devices.

In various embodiments, the memory 604 can include both volatile and nonvolatile memory and data storage components. Volatile components are those that do not retain data values upon loss of power. Nonvolatile components are those that retain data upon a loss of power. Thus, the memory 604 can include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

The processor 602 can be embodied as one or more processors 602 and the memory 604 can be embodied as one or more memories 604 that operate in parallel, respectively, or in combination. Thus, the local interface 606 facilitates communication between any two of the multiple processors 602, between any processor 602 and any of the memories 604, or between any two of the memories 604, etc. The local interface 606 can include additional systems designed to coordinate this communication, including, for example, a load balancer that performs load balancing.

As discussed above, the model engine 130, and the components thereof, can be embodied, at least in part, by software or executable-code components for execution by general purpose hardware. Alternatively the same can be embodied in dedicated hardware or a combination of software, general, specific, and/or dedicated purpose hardware. If embodied in such hardware, each can be implemented as a circuit or state machine, for example, that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart or process diagrams in FIG. 5 is representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 602. The machine code can be converted from the source code, etc. Further, each block can represent, or be connected with, a circuit or a number of interconnected circuits to implement a certain logical function or process step.

Although the flowchart or process diagrams in FIG. 5 illustrates a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Also, any logic or application described herein, including the model engine 130 that are embodied, at least in part, by software or executable-code components, can be embodied or stored in any tangible or non-transitory computer-readable medium or device for execution by an instruction execution system such as a general purpose processor. In this sense, the logic can be embodied as, for example, software or executable-code components that can be fetched from the computer-readable medium and executed by the instruction execution system. Thus, the instruction execution system can be directed by execution of the instructions to perform certain processes such as those illustrated in FIG. 5. In the context of the present disclosure, a non-transitory computer-readable medium can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium can include a RAM including, for example, an SRAM, DRAM, or MRAM. In addition, the computer-readable medium can include a ROM, a PROM, an EPROM, an EEPROM, or other similar memory device.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

At least the following is claimed:

1. A method to evaluate a cyber-security attack, comprising:
constructing an attack graph based on characteristics of a network of computing systems, the attack graph including a plurality of nodes, each of the plurality of nodes beinq associated with a vulnerability in the network of computing systems;
assigning at least one vulnerability score to at least one of the plurality of nodes in the attack graph;
developing a state transition probability matrix based on the attack graph and the at least one vulnerability score;
estimating an expected path length (EPL) of an attacker of the network of computing systems based on the state transition probability matrix, the EPL corresponding to a number of steps the attacker will take starting from an initial state node to a goal state node in the attack graph; and
ranking the vulnerability associated with each of the plurality of nodes among each other with respect to contribution to the EPL.

2. The method according to claim 1, wherein estimating the EPL comprises estimating a number of steps that the attacker will take to reach the goal state node in the attack graph with a probability of about 1.

3. The method according to claim 1, wherein estimating the EPL comprises estimating a minimum number of steps that the attacker will take to reach the goal state node in the attack graph with a probability of about 1.

4. The method according to claim 1, wherein estimating the EPL comprises, for a number of values of the at least one vulnerability score, estimating a minimum number of steps that the attacker will take to reach the goal state node in the attack graph with a probability of about 1.

5. The method according to claim 1, further comprising developing a model to find the EPL of the attacker from an initial state node in the attack graph to the goal state node in the attack graph.

6. The method according to claim 1, wherein the at least one vulnerability score comprises a Common Vulnerability Scoring System (CVSS) metric score.

7. The method according to claim 1, wherein each of the plurality of nodes in the attack graph is associated with a computing device or service executing on the computing device in the network of computing systems.

8. A system to evaluate a cyber-security attack, comprising:
a memory device configured to store computer-readable instructions thereon; and
at least one processing device directed, through execution of the computer-readable instructions, to:
construct an attack graph based on characteristics of a network of computing systems, the attack graph including a plurality of nodes, each of the plurality of nodes beinq associated with a vulnerability in the network of computing systems;
assign at least one vulnerability score to at least one of the plurality of nodes in the attack graph;
develop a state transition probability matrix based on the attack graph and the at least one vulnerability score;
estimate an expected path length (EPL) of an attacker of the network of computing systems based on the state transition probability matrix, the EPL corresponding to a number of steps the attacker will take starting from an initial state node to a goal state node in the attack graph; and
rank the vulnerability associated with each of the plurality of nodes among each other with respect to contribution to the EPL.

9. The system according to claim 8, wherein the at least one processing device is further configured to estimate a number of steps that the attacker will take to reach the goal state node in the attack graph with a probability of about 1.

10. The system according to claim 8, wherein the at least one processing device is further configured to estimate a minimum number of steps that the attacker will take to reach the goal state node in the attack graph with a probability of about 1.

11. The system according to claim 8, wherein the at least one processing device is further configured, for a number of values of the at least one vulnerability score, to estimate a minimum number of steps that the attacker will take to reach the goal state node in the attack graph with a probability of about 1.

12. The system according to claim 8, wherein the at least one processing device is further configured to develop a model to find the EPL of the attacker from an initial state node in the attack graph to the goal state node in the attack graph.

13. The system according to claim 8, wherein the at least one vulnerability score comprises a Common Vulnerability Scoring System (CVSS) metric score.

14. The system according to claim 8, wherein each of the plurality of nodes in the attack graph is associated with a computing device or service executing on the computing device in the network of computing systems.

15. A method to evaluate a cyber-security attack, comprising:
constructing an attack graph based on characteristics of a network of computing systems, the attack graph including a plurality of nodes, each of the plurality of nodes beinq associated with a vulnerability in the network of computing systems;
assigning at least one vulnerability score to at least one of the plurality of nodes in the attack graph;
developing a state transition probability matrix based on the attack graph and the at least one vulnerability score;
estimating an expected path length (EPL) of an attacker of the network of computing systems based on the state transition probability matrix; and
ranking the vulnerability associated with each of the plurality of nodes among each other with respect to contribution to the EPL.

16. The method according to claim 15, wherein estimating the EPL comprises estimating a minimum number of steps that the attacker will take to reach a goal state node in the attack graph with a probability of about 1.

17. The method according to claim 1, wherein estimating the EPL comprises, for a number of values of the at least one vulnerability score, estimating a minimum number of steps that the attacker will take to reach a goal state node in the attack graph with a probability of about 1.

18. The method according to claim 15, wherein:
each of the plurality of nodes is associated with a vulnerability in the network of computing systems; and
the method further comprises ranking the vulnerability associated with each of the plurality of nodes among each other with respect to contribution to the EPL.

\* \* \* \* \*